W. F. FOLMER.
VIEW FINDER.
APPLICATION FILED OCT. 6, 1909.
989,240.
Patented Apr. 11, 1911.
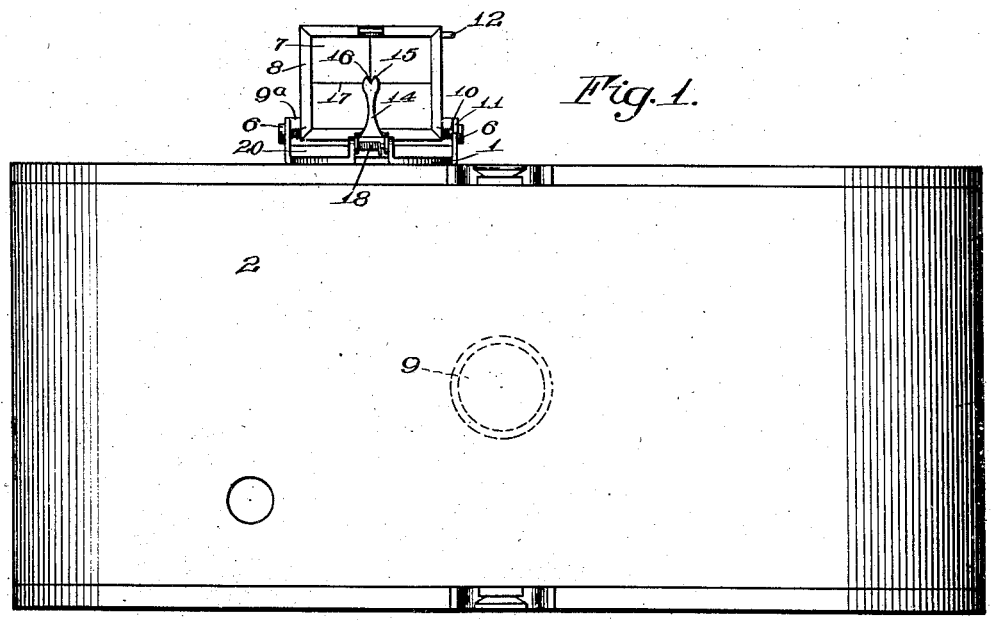
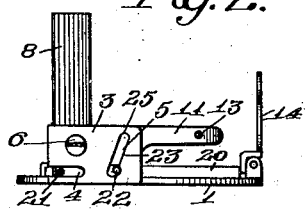
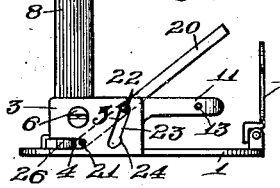
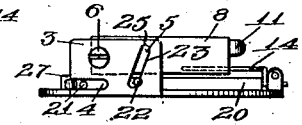
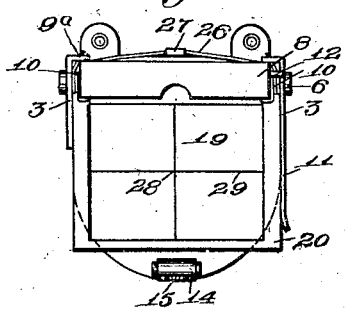
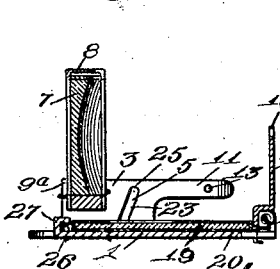
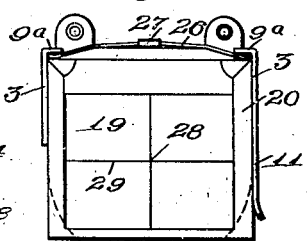

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

VIEW-FINDER.

989,240.  Specification of Letters Patent.  Patented Apr. 11, 1911.

Application filed October 6, 1909. Serial No. 521,255.

*To all whom it may concern:*

Be it known that I, WILLIAM F. FOLMER, of Rochester, in the county of Monroe and State of New York, have invented certain new and useful Improvements in View-Finders; and I do hereby declare the following to be a full, clear, and exact description of the same, reference being had to the accompanying drawings, forming a part of this specification, and to the reference-numerals marked thereon.

The present invention relates to photography and it has for its object to provide a compact, simple and efficient device in the nature of a view finder for attachment to or use in connection with photographic cameras and similar instruments, said finder being of the type which condenses the image of the object to be photographed and enables the photographer to both accurately direct the camera lens and to properly position the image cast thereby upon the sensitized surface.

The improvements are further directed toward providing means whereby the user can inspect the view, as defined by the finder, by directing his gaze either in parallelism to the axis of the finder lens and camera lens or at an angle thereto, means being also provided for alining the optical axis of his eye with that of the finder lens.

To these and other ends the invention consists in certain improvements and combinations of parts all as will be hereinafter more fully described, the novel features being pointed out in the claims at the end of the specification.

In the drawings: Figure 1 is a rear elevation of a camera having mounted thereon a view finder constructed in accordance with and illustrating one embodiment of my invention, the latter being in its operative position for a survey of the object from the rear of the camera; Fig. 2 is a side elevation of the finder, detached, but in the same position; Fig. 3 is a side elevation showing the finder adjusted for the inspection of an object from above, or from the side of the camera; Fig. 4 is a side elevation of the finder with all its parts in folded position; Fig. 5 is a top plan view with the parts in the position of Fig. 2; Fig. 6 is a central section with the parts in the position of Fig. 2, and Fig. 7 is a plan view of the parts in the position of Fig. 4.

Similar reference numerals throughout the several figures indicate the same parts.

Referring more particularly to the drawings, 1 indicates a supporting plate adapted to be secured preferably to the outer side of the top wall of the camera 2 and provided with oppositely arranged side flanges 3 having horizontally extending slots 4 therein, open at their forward ends, and also provided with rearwardly inclined slots 5. Pivoted above the slots 4 on studs 6 is the finder lens 7 mounted in a suitable frame 8 and having an erect operative position at right angles to the camera wall and supporting plate, or more particularly parallel to the plane of the camera lens 9, the latter being indicated by dotted lines in Fig. 1. The finder lens has a tendency to assume this operative position of Figs. 1, 2, 3 and 6, defined by its engagement with stops 9ª on the support under the influence of springs 10 coiled about the studs 6 and bearing thereon. In this position, the axis of the finder lens is parallel with that of the camera lens and sufficiently near being coincident therewith for the purpose of similarly reflecting the images of objects at a distance.

The lens frame 8 can be rotated to the folded position of Figs. 4 and 7 against the tensions of the springs 10, in which position it is parallel with the camera wall and the plate 1 and spaced slightly from both by reason of the elevated position of its axis, its lower edge being also similarly spaced when in its operative position, and it is held in its folded position by a resilient arm 11 extending rearwardly from one of the flanges 3 parallel with the lens, the latter and the arm being provided respectively with coöperating projecting and recessed portions 12 and 13 which automatically engage and are released by lateral deflection of the arm to allow the lens to reassume its operative position.

At the rear of the plate 1 is pivotally mounted to move in a vertical plane a sight arm 14 provided with a sighting notch 15 while the intersecting point 16 of cross hairs 17 on the lens 7 forms a centering device, which when viewed within the notch 15 of the sight arm from in rear of the camera, brings the axis of the eye coincident with the axis of the lens in the well known manner of a gun sight. The sight arm also has a normal tendency to assume its erect or operative position under the influence of the spring 18 but is held by the lens in the folded position beneath the same, as shown in Fig. 4, being automatically released therewith.

The finder, so far as now described, is sufficient for the purpose when the object to be photographed or viewed is sufficiently distant or sufficiently elevated to permit the operator to hold the camera in front of his eye, but for use in instances wherein he desires to hold the camera above or below his eye or far out at the side, as for example were he desirous of photographing a view over a fence in which case he would invert the camera, or a child very near by in which case he would hold the camera below his eye, I provide means for reflecting the image in a direction transversely to the axes of both the finder lens and the camera lens. The said means embodies in the present instance a mirror 19 mounted in a suitable frame 20 provided near its lower edge with laterally extending pivotal journals 21 guided in the slots 4 which constitute sliding bearings therefor, while laterally projecting abutments 22 nearer the center of the frame are received in the inclined slots 5. The rear walls 23 of these last mentioned slots form cams or guiding surfaces terminating at their lower ends in locking shoulders 24, while the upper end of the slot forms an abutment 25 at the other end. A leaf spring 26, mounted preferably centrally at 27 on the support 1, bears at either end upon the mirror frame in the region of its journals tending to slide the latter rearwardly in the bearings or guides 4 and to ride the abutments 22 of the mirror up the surfaces 23 into engagement with the abutments 25 which maintains the mirror in the operative position of Fig. 3 at an acute angle to the finder lens 7 and to the support and camera walls, the journal pins 21 which form the other points of support, being held by the spring at the rear ends of the bearing slots. The image cast by the lens is therefore reflected at an angle, in the present instance at a right angle away from the camera.

The mirror has a folded position parallel with and against the plate 1, beneath the finder lens, when folded, to which position it is rotated by downward pressure. At the beginning of this downward movement its axis 21 is at one side of and in rear of the central plane of the lens 7, but as it descends, the engagement of the abutments 22 with the cam surface 23 forces its axis transversely through the plane of the lens from the position of Fig. 3 to that of Fig. 2 against the tension of the spring 26 and it will therefore be seen that the mirror moves forwardly in its own plane so that in its folded position its front edge is thrust forwardly beneath the lens. This movement, it will be seen, greatly lessens the necessary length over all of the finder from front to rear. When the mirror has reached this folded position, the abutments 22 engage behind the locking shoulders 24 under the influence of the spring 26 and hold the mirror secured until, in being manually raised, the spring is forcibly displaced. With all parts of the finder in folded position the sight arm 14 is held between the mirror and the lens, as shown in Fig. 4, so that with a deflection of the arm 11 both the mirror and the arm 14 rotate immediately to the operative position ready for conjoint use without disturbing the mirror, and when the latter is brought into play the fact of the sight 14 being in its operative position is not objectionable.

In order to properly aline the gaze of the operator with the double reflection of the image the mirror 19 is also preferably provided with a centering device 28 formed by the intersection of cross hairs 29, which point 28 coincides with the reflected image of the point 16 on the lens when the axis of the eye has been brought coincident with the reflected axial rays of the lens.

It will be understood that the utility of my invention is not necessarily limited to a connection with photographic cameras as it can be taken advantage of in any instance where a condensed view is desired and the nature of its function will readily suggest its application to other instruments and uses.

I claim as my invention:

1. In a view finder, the combination with a support adapted to be secured to a camera wall, of a lens pivoted to the support and having an operative position at an angle to the camera wall and a folded position substantially parallel with the latter, a reflecting mirror also pivoted to the support having an operative position at an angle to both the lens and camera wall and an inoperative position parallel with the latter and a rear sight arm pivoted to the support on the same side of the lens as the mirror having an operative position in the axes of the lens and adapted to assume a folded position between the lens and mirror when the latter are in folded positions.

2. In a view finder, the combination with a support carrying a lens, of a mirror pivoted on the support on an axis normally arranged at one side of the plane of the lens, means for maintaining the mirror in an operative position at an acute angle to the latter, and a bearing for the pivot of the mirror in which it is adapted to slide toward the plane of the lens.

3. In a view finder, the combination with a support carrying a lens, of a mirror pivoted on the support on an axis normally arranged at one side of the plane of the lens, means for maintaining the mirror in an operative position at an acute angle to the latter, a bearing for the pivot of the mirror in which it is adapted to slide toward the plane of the lens and means for sliding the pivot beneath the lens when the mirror is rotated to an inoperative position substantially at right angles to the lens.

4. In a view finder, the combination with a support carrying a lens, of a mirror pivoted on the support on an axis normally arranged at one side of the plane of the lens, means for maintaining the mirror in an operative position at an acute angle to the latter, a bearing for the pivot of the mirror in which it is adapted to slide toward the plane of the lens and means for sliding the pivot beneath the lens when the mirror is rotated to an inoperative position substantially at right angles to the lens embodying a cam and a coöperating abutment, one of which parts is arranged on the mirror and the other on a relatively stationary part.

5. In a view finder, the combination with a support carrying a lens, of a mirror pivoted on the support on an axis normally arranged at one side of the plane of the lens, means for maintaining the mirror in an operative position at an acute angle to the latter, and a bearing for the pivot of the mirror in which it is adapted to slide toward the plane of the lens, a spring acting against the mirror to resist such sliding movement, and means for sliding the pivot beneath the lens when the mirror is rotated to folded position substantially at right angles to the lens embodying a relatively stationary cam, an abutment on the mirror coöperating therewith and a locking shoulder at the end of the cam engaged by the abutment under the influence of the spring to lock the mirror in folded position.

6. In a view finder, the combination with a support, of a lens and a mirror pivoted thereon and having relatively angular operative positions, a bearing on the support on which the pivot of the mirror is adapted to slide when the lens and mirror are moved to inoperative parallel positions and means for sliding the pivot of the mirror on its bearing to the other side of the pivot of the lens during such movement.

7. In a view finder, the combination with a support adapted to be secured to a camera wall and embodying side flanges having one set of guides therein parallel with said wall and a second set extending transversely of the first and terminating in locking shoulders, of a lens on the support, a mirror having an operative position at an angle to the lens and an inoperative position parallel with the wall, projecting journals on the mirror arranged to slide in said first mentioned guides, a spring on the support tending to move them therein, and projections on the mirror traveling in the second set of guides as the mirror is rotated and adapted to lock against the shoulder under the influence of the spring when the mirror reaches one of the said positions.

8. In a view finder, the combination with a support and a lens mounted thereon, of a pivoted mirror having an operative position at an acute angle to the lens adapted to rotate to an inoperative position against the support, bearings on the latter on which the pivots of the mirror are adapted to slide, a guiding surface on the support extending transversely of the direction of sliding movement of the mirror in its bearings, said surface terminating at one end in an abutment, an abutment on the mirror traveling on the guiding surface when the mirror is rotated, and a spring normally tending to slide the mirror in one direction in its bearings and to hold its abutment in engagement with that on the guiding surface to maintain the mirror in operative position.

9. In a view finder, the combination with a support and a lens mounted thereon, of a pivoted mirror having an operative position at an acute angle to the lens adapted to rotate to an inoperative position against the support, bearings on the latter on which the pivots of the mirror are adapted to slide, a guiding surface on the support extending transversely of the direction of sliding movement of the mirror in its bearings, said surfaces terminating at one end in an abutment and having a locking shoulder at the other, an abutment on the mirror traveling on the guiding surface when the mirror is rotated between its two positions and a spring tending to slide the mirror in one direction in its bearings and to hold its abutment in engagement with that on the guiding surface to maintain the mirror in operative position or in engagement with the locking shoulder to hold the mirror in inoperative position.

10. In a view finder, the combination with a support having relatively angularly arranged guides and a lens mounted on the support, of a mirror having an operative position at an acute angle to the lens and provided with projections operating in the guides and a spring bearing on the mirror to hold the projections at corresponding ends of the guides and maintain the mirror in operative position.

11. In a view finder, the combination with a support having relatively angularly arranged guides and a lens mounted on the support, of a mirror having an operative position at an acute angle to the lens and provided with projections operating in the guides, a spring bearing on the mirror to hold the projections at corresponding ends of the guides and maintain the mirror in operative position and a locking shoulder at the opposite end of one guide with which one of the projections coöperates under the tension of the spring when the mirror is moved to an inoperative position.

12. In a view finder, the combination with a supporting plate adapted to be secured to a camera wall and having side flanges each provided with a slot parallel with the plate and forming a guide, one of the flanges being also provided with a slot extending angularly to the other and having a locking shoulder at the end thereof, of a lens pivoted between the flanges on an axis arranged above the slotted guides, said lens having an operative position at right angles to the supporting plate and a folded position parallel therewith, a mirror having projecting journals thereon movable in the slotted guides, said mirror having an operative position at an acute angle to the lens and a folded position parallel with the supporting plate, a projection on the mirror traveling in the inclined slot as the mirror is rotated from its operative position to its inoperative position for causing it to simultaneously move on the slotted guides partially beneath the lens and the axis of movement thereof and a leaf spring on the support engaging the mirror to force it in the opposite direction, said spring operating to hold the projection in engagement with the locking shoulder when the mirror is in folded position or to hold it against the opposite end of the slot and maintain the mirror in its operative position.

WILLIAM F. FOLMER.

Witnesses:
RUSSELL B. GRIFFITH,
LUCY A. VAN COURT.